(12) United States Patent
Hung

(10) Patent No.: US 6,822,357 B2

(45) Date of Patent: Nov. 23, 2004

(54) LUMINOUS DEVICE CAPABLE OF AUTOMATICALLY GENERATING POWER

(76) Inventor: Pao Chuang Hung, No. 91, Sec. 2, Tze Chiang Rd., San Chung City, Taipei Hsien (TW)

( * ) Notice: Subject to any disclaimer, the term of this patent is extended or adjusted under 35 U.S.C. 154(b) by 84 days.

(21) Appl. No.: 10/161,727

(22) Filed: Jun. 5, 2002

(65) Prior Publication Data

US 2003/0227223 A1 Dec. 11, 2003

(30) Foreign Application Priority Data

Apr. 23, 2002 (TW) .................................... 91205548 U

(51) Int. Cl.[7] .................... H02K 11/00; H02K 7/10; H02K 7/00; B60Q 3/00; B62J 6/00

(52) U.S. Cl. ................ 310/75 C; 310/75 B; 310/73; 310/67 A; 362/459; 362/473

(58) Field of Search ................ 310/73, 75 C, 310/75 B, 67 A, 67 R; 362/473, 474, 475, 459, 476, 500, 485, 478, 193, 192, 157; 301/110.5, 124.1

(56) References Cited

U.S. PATENT DOCUMENTS

| | | | | |
|---|---|---|---|---|
| 2,088,029 A | * | 7/1937 | McDermott | 310/67 A |
| 4,191,988 A | * | 3/1980 | Kumakura | 362/473 |
| 4,298,910 A | * | 11/1981 | Price | 362/35 |
| 4,636,670 A | * | 1/1987 | Kallstrom | 310/67 A |
| 4,763,230 A | * | 8/1988 | Cummings et al. | 362/473 |
| 4,860,176 A | * | 8/1989 | Bauwens et al. | 310/67 A |
| 4,901,209 A | * | 2/1990 | Nitz | 362/473 |
| 5,115,159 A | * | 5/1992 | Takamiya et al. | 310/67 A |
| 5,461,269 A | * | 10/1995 | de Raucourt | 310/67 A |
| 5,584,562 A | * | 12/1996 | Geran | 362/473 |
| 5,590,946 A | * | 1/1997 | Jung | 362/475 |
| 5,653,523 A | * | 8/1997 | Roberts | 362/500 |
| 5,903,224 A | * | 5/1999 | Reynolds | 340/815.45 |
| 6,016,022 A | * | 1/2000 | Cho | 310/75 C |
| 6,220,733 B1 | * | 4/2001 | Gordon | 362/500 |
| 6,474,832 B2 | * | 11/2002 | Murray | 362/192 |
| 6,501,199 B2 | * | 12/2002 | Hung | 310/67 A |
| 6,530,683 B1 | * | 3/2003 | Ohkohdo et al. | 362/511 |
| 6,565,242 B2 | * | 5/2003 | Dai | 362/500 |
| 6,619,823 B2 | * | 9/2003 | Dai | 362/500 |

* cited by examiner

Primary Examiner—Tran Nguyen
Assistant Examiner—Julio Gonzalez
(74) Attorney, Agent, or Firm—Troxell Law Office PLLC

(57) ABSTRACT

A luminous device capable of automatically generating power includes a set of induction coils with one end connecting to a luminous element and placed inside a light conductor which is fastened onto a steel wire of a wheel via a fastening structure; one or more than one magnets are disposed inside a magnet case corresponding to the set of induction coils. Therefore, when the wheel spins, it drives the light conductor to rotate thereby generating electric current between the set of induction coils and the magnet to further drive the luminous element. In addition, the light conductor guides the light source of the luminous element outwardly so as to generate luminous and warning function.

6 Claims, 10 Drawing Sheets

US 6,822,357 B2

LUMINOUS DEVICE CAPABLE OF AUTOMATICALLY GENERATING POWER

BACKGROUND OF THE INVENTION

1) Field of the Invention

The present invention relates to a luminous device capable of automatically generating power and a fastening structure; mainly, when a wheel spins, it drives a light conductor fixedly disposed on a wheel spoke or between steel wires to rotate; therefore a set of induction coils inside the light conductor inducts with a magnet of an assembled magnet case secured on a wheel frame to generate electric current, further dive a luminous element connected at one end of the set of induction coils and guide a light source of the luminous element outwardly via the light conductor; the fastening structure is retained to a steel wire on the outer rim of a receiving portion at the distal end of the light conductor via a retaining member; an extendable catching body is inserted at the front end of the light conductor and disposed with a movable catching piece thereof to fit with a catching tooth disposed at the front end of the light conductor. Furthermore, clamp openings are disposed on two lateral sides of the extendable catching body; the extendable catching body pushes against a steel ring area, clamps the clamp openings onto the steel wires and presses the movable catching piece to stop at the catching tooth for positioning.

2) Description of the Prior Art

Usually, a wheel is not disposed with a luminous device capable of proving warning function. When in use during the night, it tends to cause accidents in dark areas. In view of this situation, most of the industrials just install some extra light reflecting straps or pieces in the wheel area for increasing the user's safety during the night. However, these kinds of light reflecting straps or pieces require the radiation of an external light source to fulfill warning function. Without the supply of light ray, the user's safety is precarious. That is the shortcoming of a conventional wheel and has been criticized by the public for a long time.

In view of the abovementioned shortcoming derived from of the conventional product, the inventor of the present invention designed a luminous device capable of automatically generating power and a fastening structure with increased effects.

SUMMARY OF THE INVENTION

The primary objective of the present invention is to provide a luminous device capable of automatically generating power by utilizing a spinning wheel to drive a light conductor fixedly disposed on a wheel spoke or between steel wires to rotate; therefore, a set of induction coils inducts with a magnet of an assembled magnet case secured on a wheel frame to generate electric current, further drive a luminous element connected at one end of the set of induction coils and guide a light source of a luminous element outwardly via the light conductor so as to achieve a safe warning effect.

Another objective of the present invention is to provide a luminous device capable of automatically generating power, wherein an assembled magnet case is secured on a wheel frame through a universal joint; the assembly is accomplished without requiring the detachment of the wheel or the wheel frame; furthermore, the universal joint adjusts the angle of the assembled magnet case to precisely align the magnet thereon with the set of induction coils.

Yet another objective of the present invention is to provide a luminous device capable of automatically generating power, wherein the light conductor is a solid or a hollow body with its external surfaces formed with a plurality of matted planes, concave rings, convex portions or through holes to refract or reflect the light; through the reflecting and refracting function of two different mediums and interfaces, a single light source generates a multi light-spot effect and a visual effect of further lightening up the whole wheel surface when the wheel spins.

Still another objective of the present invention is to provide a fastening structure; for the wheel with steel wires, a retaining member is retained onto the steel wires on the outer rims of a receiving portion at the distal end of the light conductor; an extendable catching body is inserted at the front end of the light conductor and disposed with a movable catching piece thereof to fit with a catching tooth disposed at the front end of the light conductor. Furthermore, clamp openings are disposed on two lateral sides of the extendable catching body; the extendable catching body pushes against a steel ring area, clamps the clamp openings onto the steel wires and presses the movable catching piece to stop at the catching tooth for positioning so as to precisely and steadily hold the luminous element between the steel wires of the wheel through a very convenient assembly.

To enable a further understanding of the structural features and the functional specialty of the present invention, the brief description of the drawings below is followed by the detailed description of the preferred embodiment.

DETAILED DESCRIPTION OF THE PREFERRED EMBODIMENTS

Figure 1:
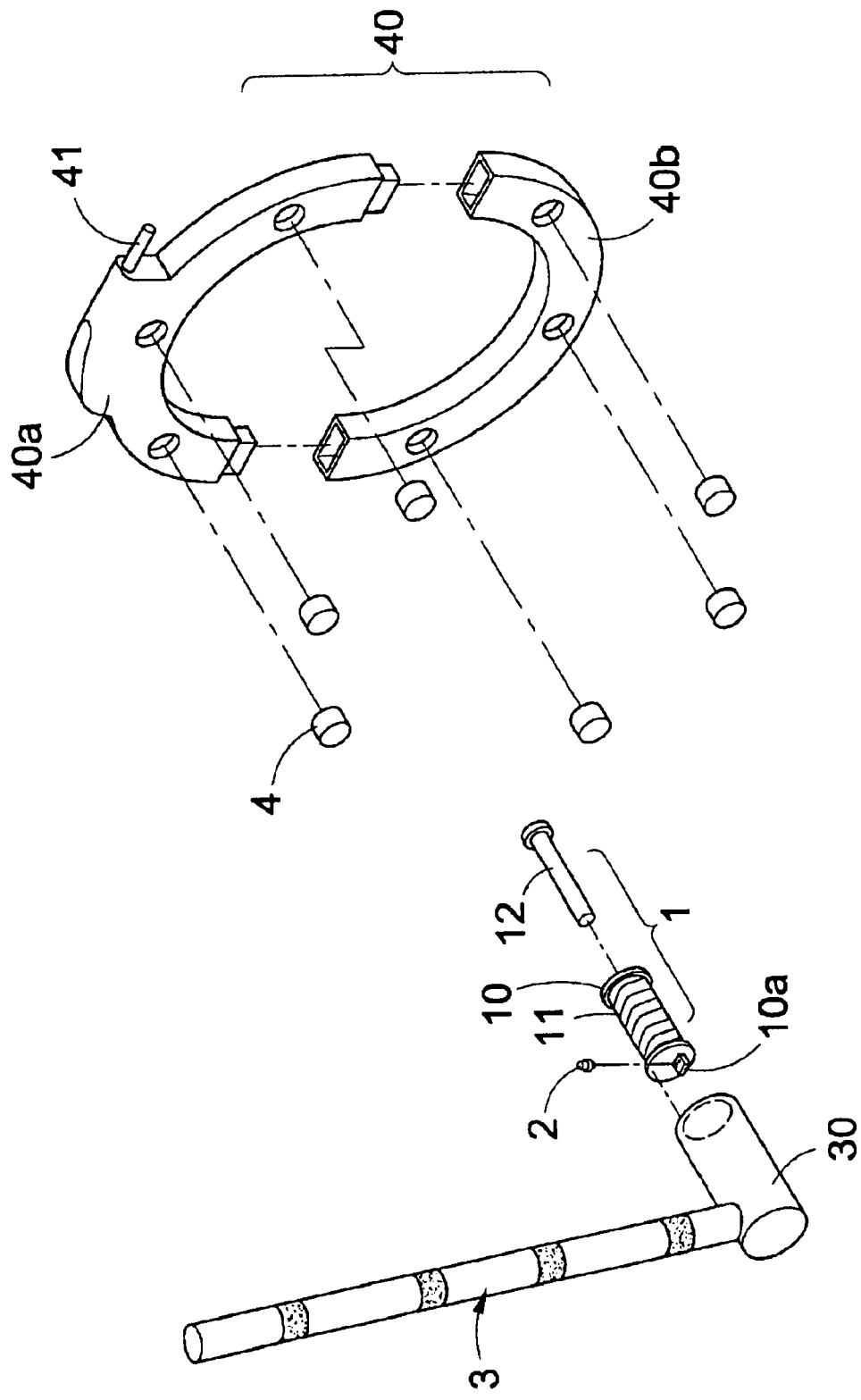
FIG. 1 is an exploded drawing of the present invention of a luminous device capable of automatically generating power.

Referring to FIG. 1, the present invention provides a luminous device capable of automatically generating power and a fastening structure; the luminous device capable of automatically generating power has a set of induction coils (1), a luminous element (2), a light conductor (3) and a magnet (4), wherein the set of induction coils (1) comprises a coil shaft (10) coiled with coils (11) and a single magnet pole (12); the single magnet pole (12) inserts into the coil shaft (10) which has one end extends to define a convex piece (10a); the luminous element (2) connects with a fuse of the coil (11) and is welded onto the convex piece (10a); the distal end of the light conductor (3) has a receiving portion (30) provided for placing the set of induction coils (1) of the luminous element (2) to assemble into one unit; the magnet (4) is disposed inside an assembled magnet case (40) jointed by two half case bodies (40a, 40b).

Figure 2:
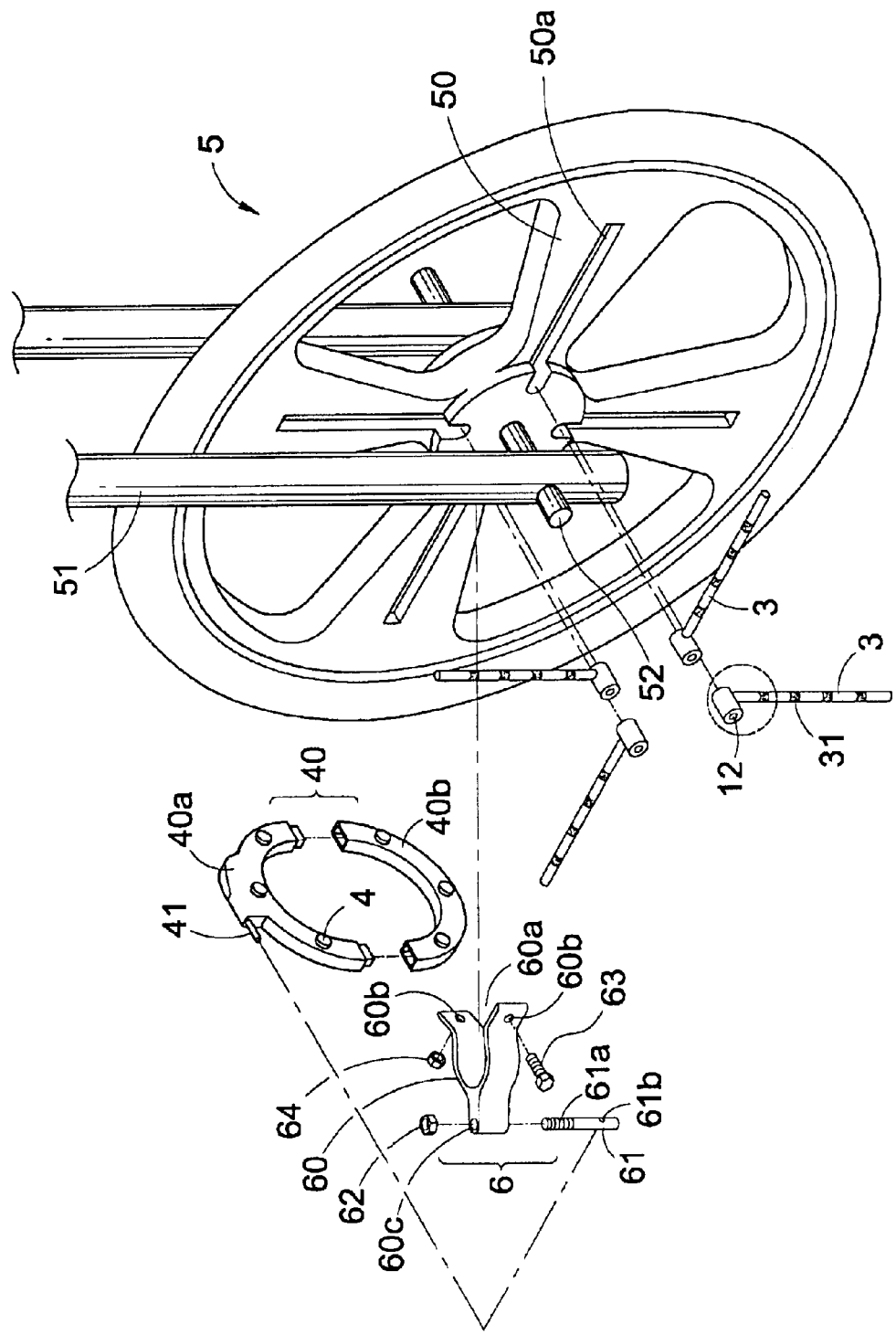
FIG. 2 is an exploded drawing of the present invention of a luminous device capable of automatically generating power fastened onto a unitarily molded wheel.
Figure 3:
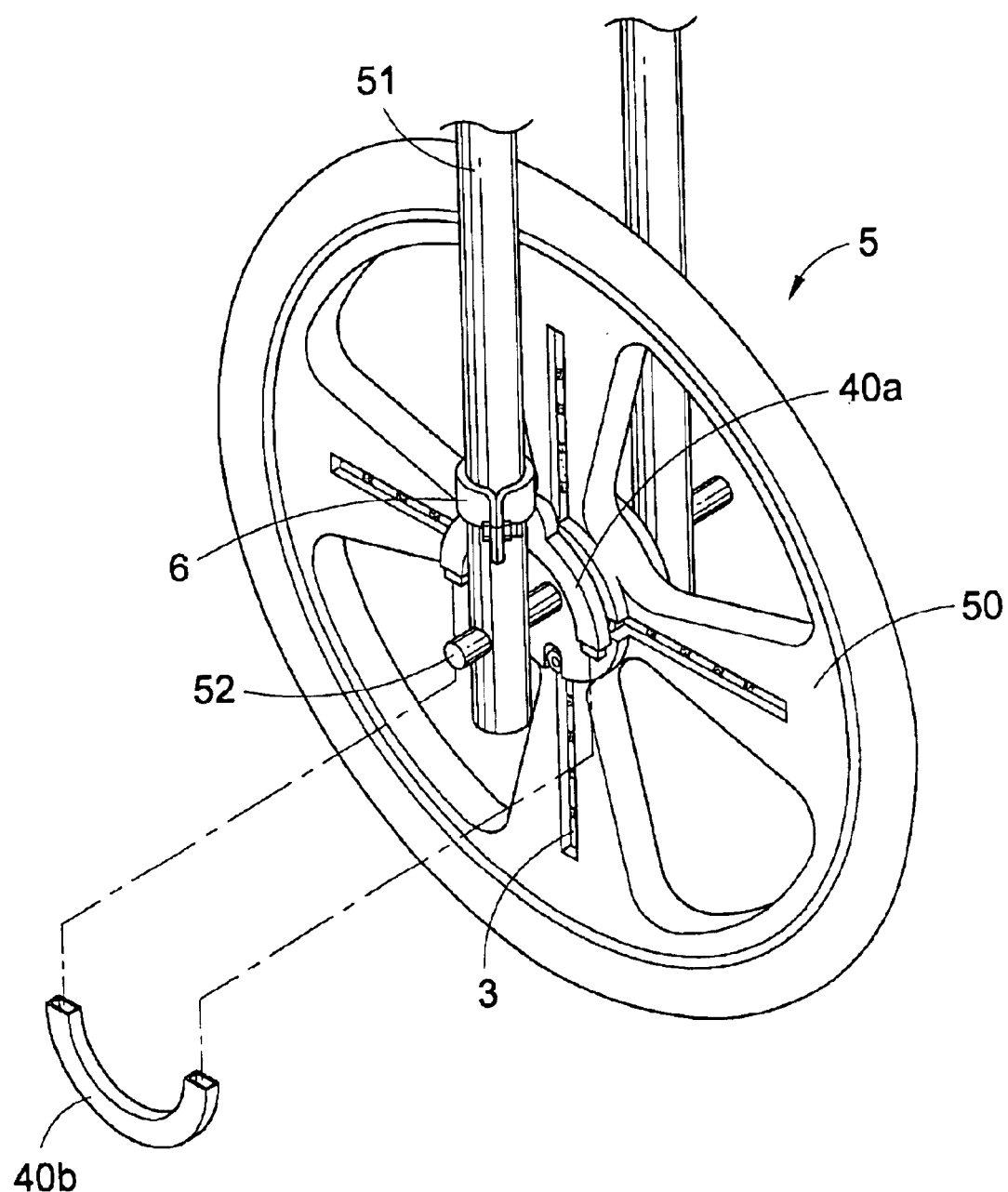
FIG. 3 is a partial drawing of the assembly of the present invention of a luminous device capable of automatically generating power fastened onto a unitarily molded wheel.
Figure 4:
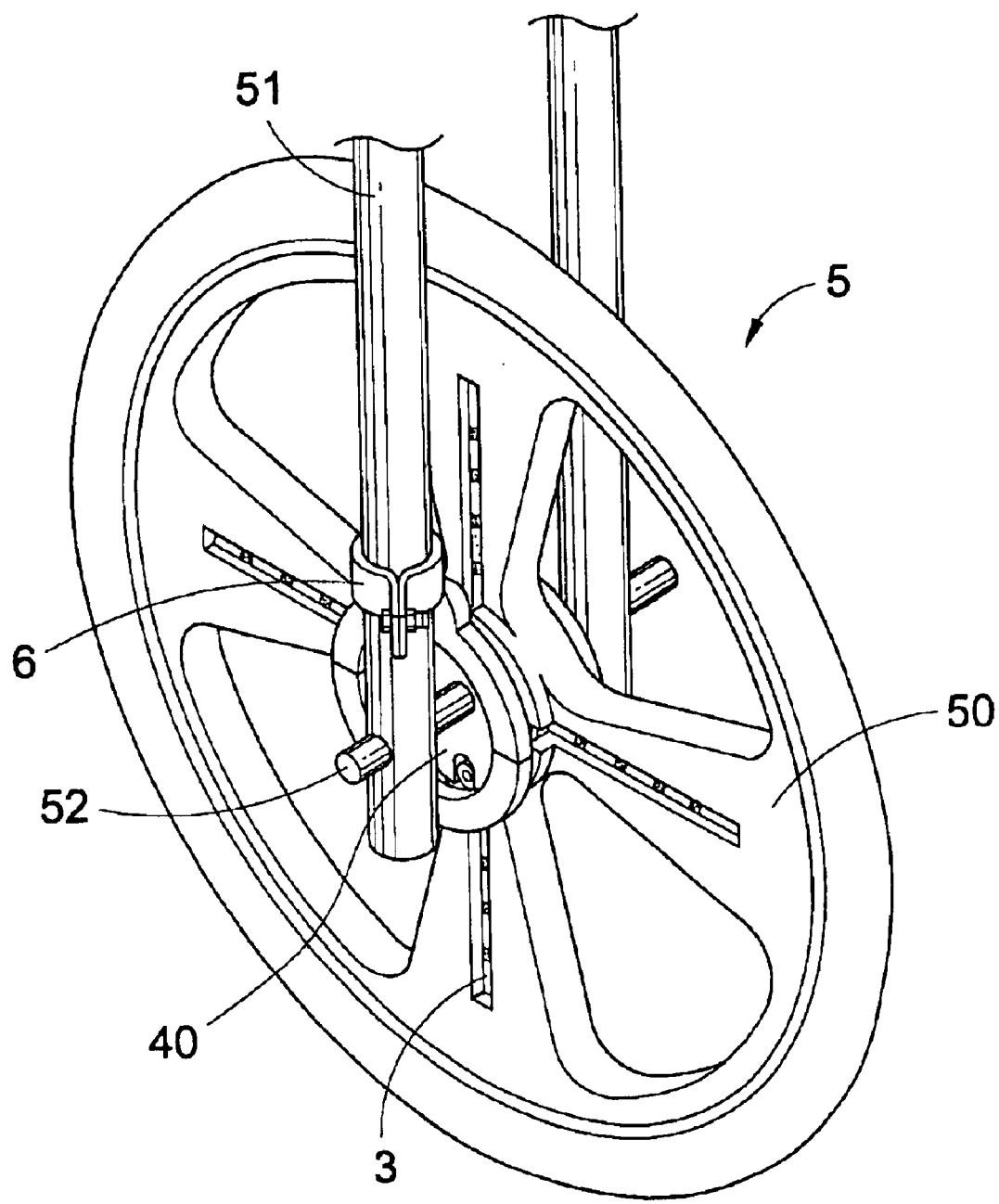
FIG. 4 is an assembled drawing of the present invention of a luminous device capable of automatically generating power fastened onto a unitarily molded wheel.

Referring to FIGS. 2 and 4, for a unitarily molded wheel (5), a groove (50a) is disposed on a wheel spoke (50) of the wheel (5) for inserting and securing the light conductor (3) therein. The assembled magnet case (40) is fastened to a vehicle frame (51) via a universal joint (6) to correspond the magnet (4) with the single magnet pole (12) of the set of induction coils (1) inside the light conductor (3); the universal joint (6) mainly comprises a clamping body (60) and a through rod (61); one end of the clamping body (60) has a opening (60a); a through hole (60b) is disposed on the clamping body (60) at the opening (60a) end. A through hole (60c) is disposed in the other end area of the clamping body (60). The front section of the through rod (61) has threads (61a) and the distal section thereof has a through hole (61b). When assembling, the through rod (61) inserts into the through hole (60c) of the clamping body (60) and a nut (62) screws onto the threads (61a) at the front section of the through rod (61) to connect the through rod (61) and the clamping body (60). After that, a positioning pine (41) disposed on the case body (40a) inserts into the through hole (61b) of the through rod (61) to connect the through rod (61) and the case body (40a). Then, the clamping body (60) clamps in the wheel frame (51) area from the opening (60a) area. A screw (63) penetrates the through hole (60b) and a nut (64) fixedly clamps the clamping body (60) onto the wheel frame (51). Finally, the case body (40b) and the case body (40a) are assembled into the assembled magnet case (40) to bridge between the wheel shafts (52) of the wheel (5).

Figure 5:
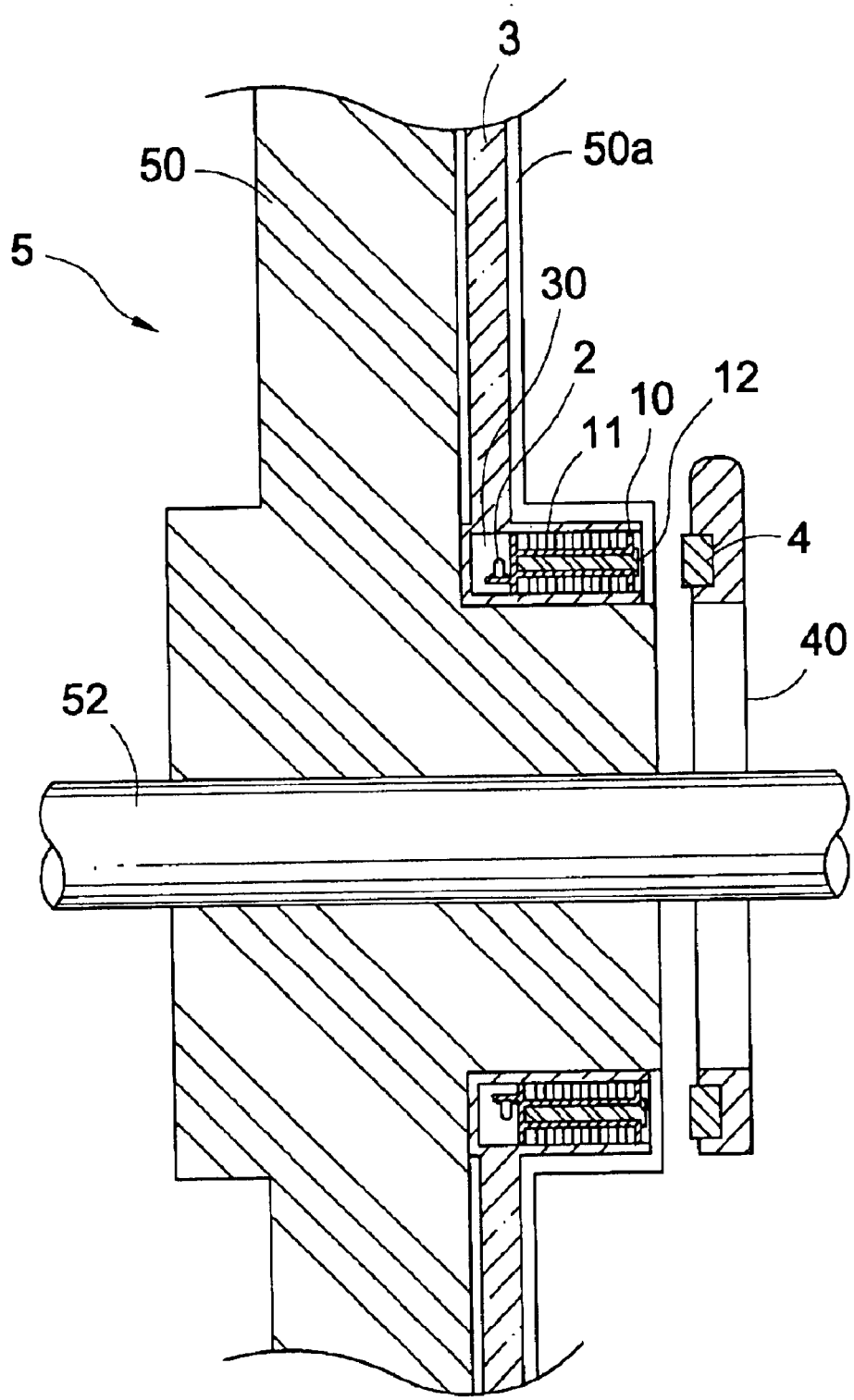
FIG. 5 is a cross-sectional drawing of FIG. 4.
Figure 6:
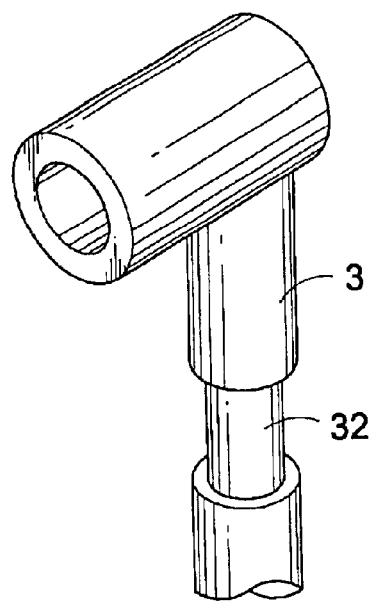
FIG. 6 is a drawing of a concave ring formed on the surface of a light conductor of the present invention.
Figure 7:
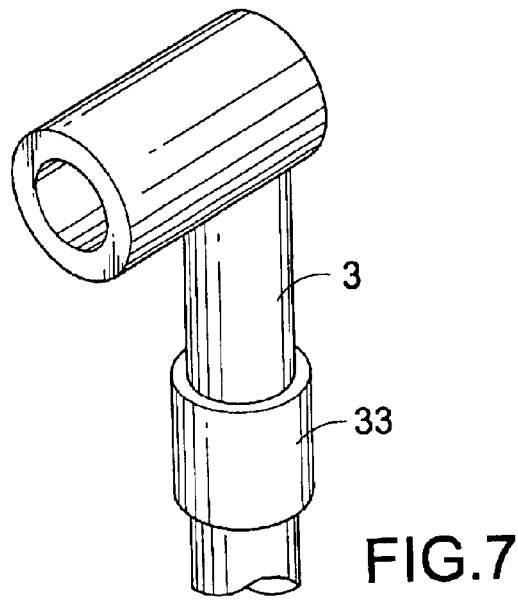
FIG. 7 is a drawing of a convex portion formed on the surface of the light conductor of the present invention.
Figure 8:
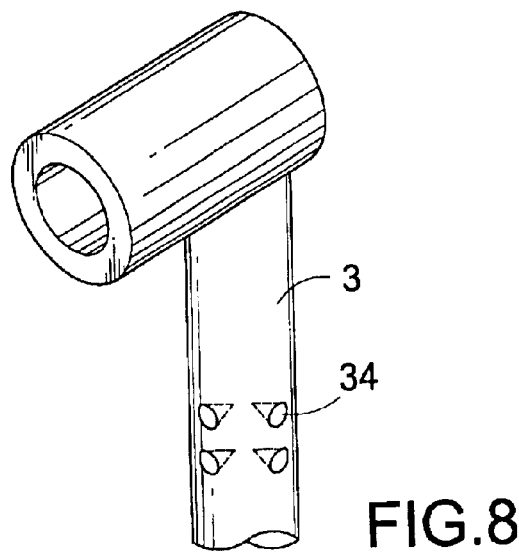
FIG. 8 is a drawing of a through hole formed on the surface of the light conductor of the present invention.

Referring to FIGS. 4 and 5, when the wheel (5) spins, it drives the light conductor (3) to rotate thereby making the set of induction coils (1) inside the light conductor (3) and the magnet (4) on the assembled magnet case (40) induct to generate electric current, further driving the luminous element (2) and guiding the light source of the luminous element (2) outwardly via the light conductor (3) thereby providing a safe and warning effect.

In addition, referring to FIGS. 2, 6, 7 and 8, the light conductor (3) is solid (in this exemplary embodiment) or hollow (not shown in this FIG.). The exterior surface thereof is formed to have a plurality of matted planes (31), concave rings (32), convex portions (33) or through holes (34) capable of refracting or reflecting the light; through the function of having light to refract or reflect at two different mediums or interfaces, a single light source generates a multi light-spot effect and a visual effect of further lightening up the whole wheel surface when the wheel (5) is spinning.

The accomplishment of assembling the assembled magnet case (40) does not require the detachment of the wheel frame (51) and that is very convenient; furthermore, it is merely necessary to loosen the nuts (62, 64) on the universal joints (6) for moving the clamping body (60) and the through rod (61) to micro-adjust the assembled magnet case (40) at different angles toward the front or rear, top or bottom, left or right directions thereby precisely aligning the magnets (4) on the assembled magnet case (40) with the set of induction coils (1).

Figure 9:
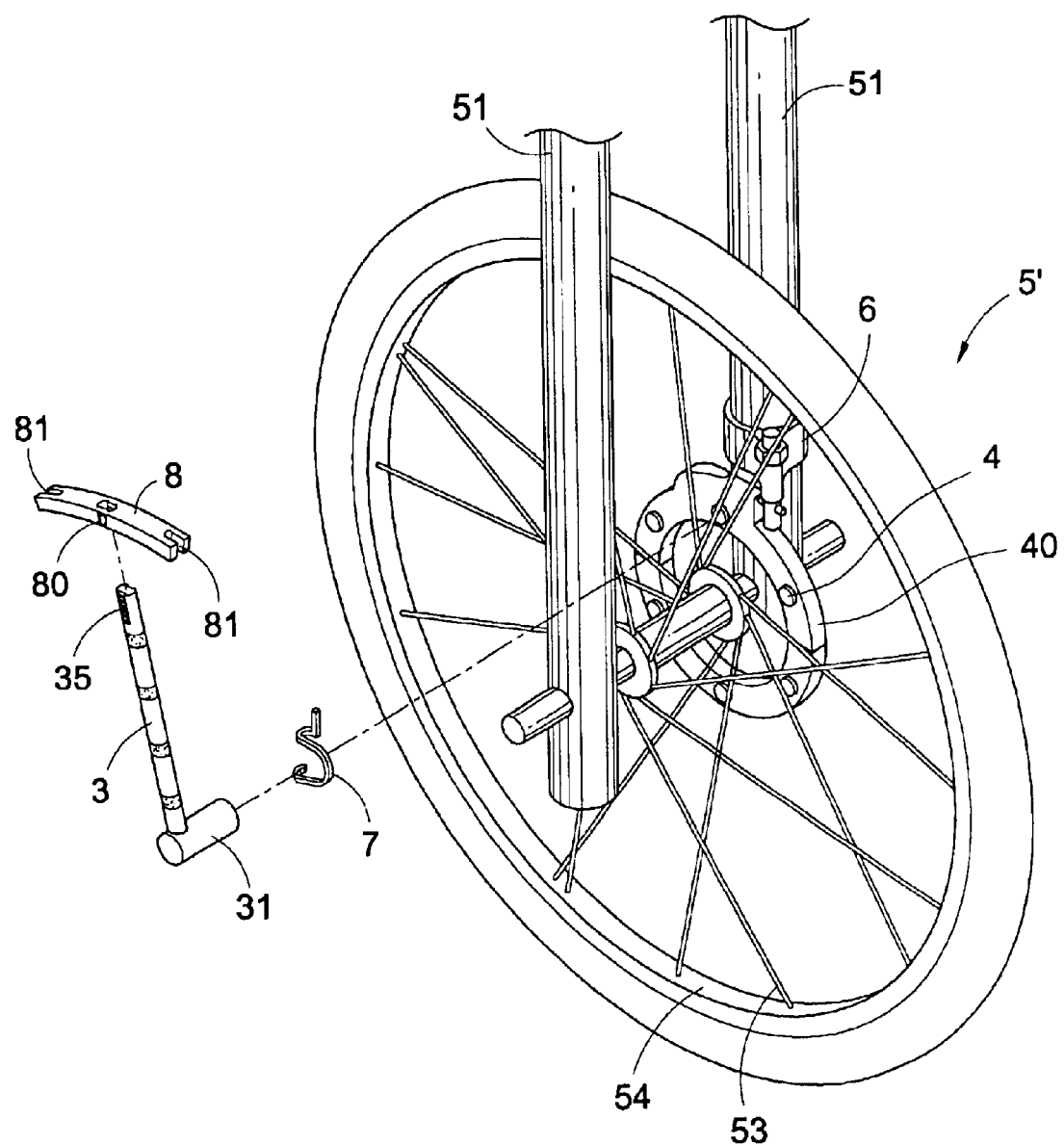
FIG. 9 is a partially exploded drawing of the present invention of a luminous device capable of automatically generating power fastened onto a wheel with steel wires.
Figure 10:
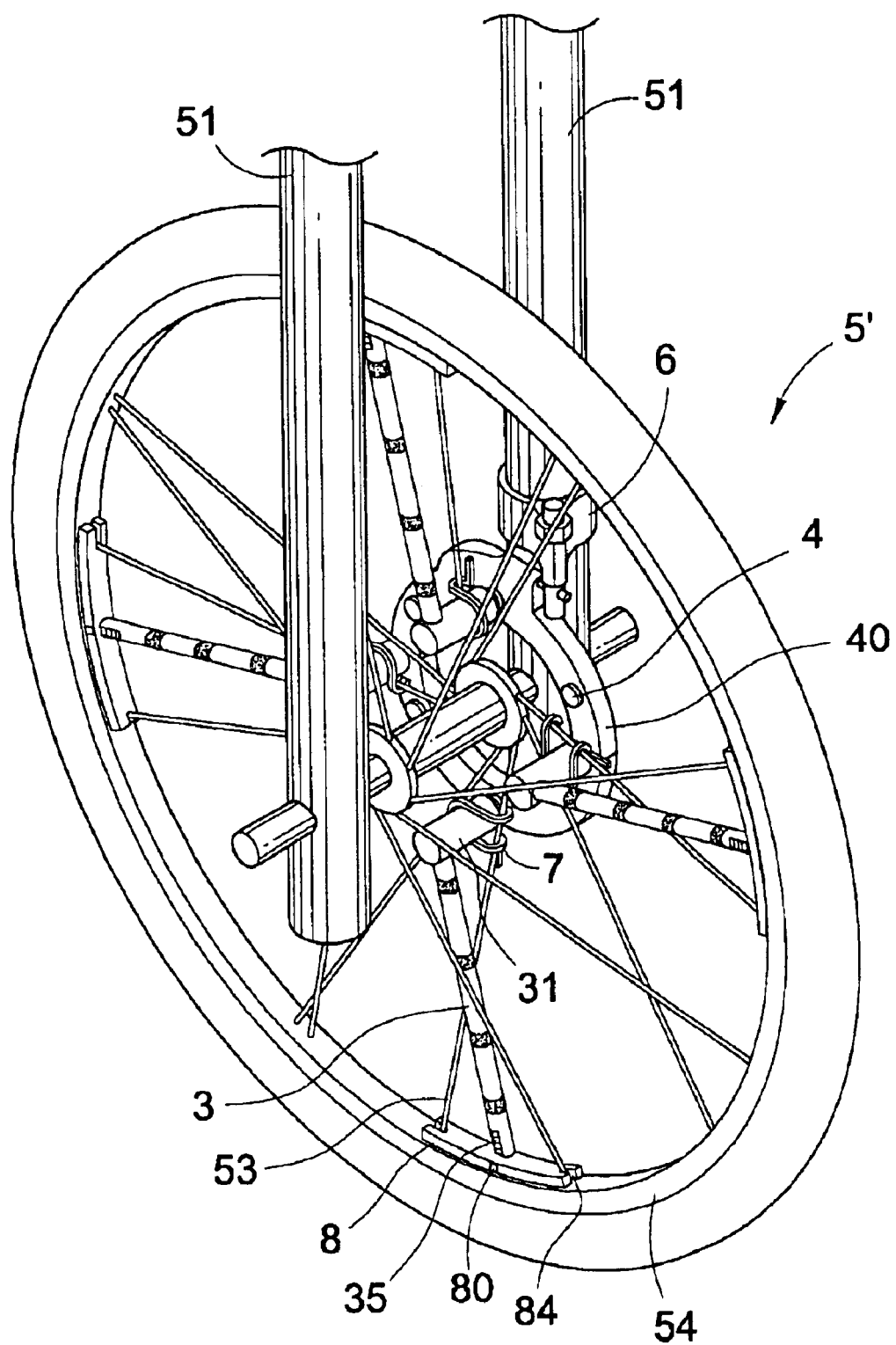
FIG. 10 a drawing of the assembly of the present invention of a luminous device capable of automatically generating power fastened onto a wheel with steel wires.

Referring to FIGS. 9 and 10, for the wheel (5') with the steel wires (53), the luminous device capable of automatically generating power cooperates with a fastening structure and is fastened onto the steel wires (53); the entire structure of the luminous device capable of automatically generating power has been described above and it will not be repetitively described here. The fastening structure mainly has a retaining member (7) retained onto the steel wires (53) on the outer rims of a receiving portion (31) at the distal end of the light conductor (3); an extendable catching body (8) is inserted at the front end of the light conductor (3) and disposed with a movable catching piece (80) thereof to fit with a catching tooth (35) disposed at the front end of the light conductor (3). Furthermore, clamp openings (81) are disposed on two lateral sides of the extendable catching body (8); the extendable catching body (8) pushes against a steel ring (54) area, clamps the clamp openings (81) onto the steel wires (53) and presses the movable catching piece (80) to stop at the catching tooth (35) for positioning so as to precisely and steadily hold the entire body between the steel wires (53) of the wheel (5') such that the user can self-assemble the present invention without detaching either wheel (5') or the wheel frame (51) in a more convenient method.

Therefore, when the wheel (5') with the steel wires (53) spins, it also drives the light conductor (3) to rotate, as the way mentioned in the above exemplary embodiment, to make the set of induction coils (1) inside the light conductor (3) induct with the magnet (4) on the assembled magnet case (40) to generate electric current, further drive the luminous element (2) and guide the light source of the luminous element (2) outwardly via the light conductor (3) to achieve the same warning effect.

Figure 11:
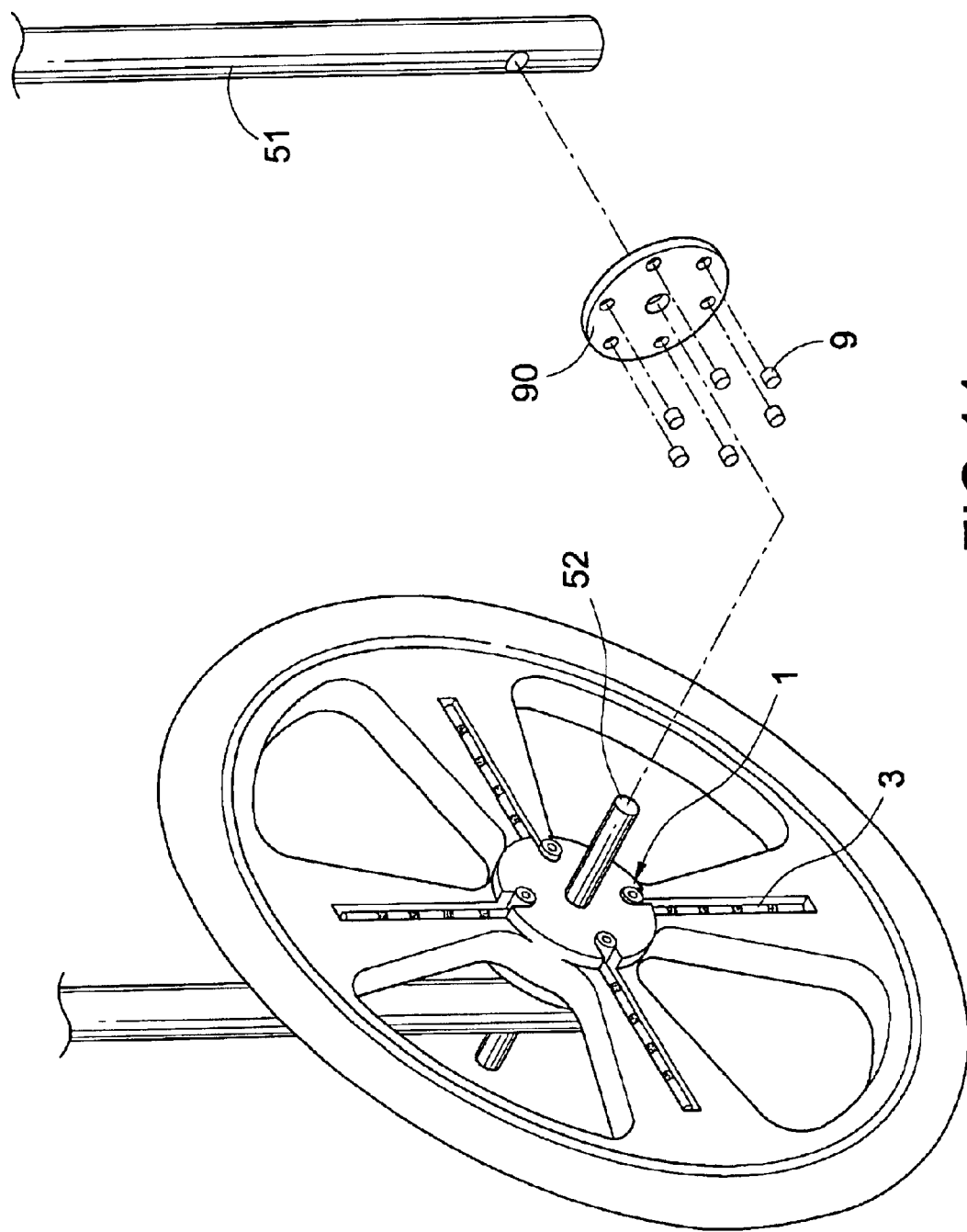
FIG. 11 is an exploded drawing of a single magnet case of the present invention fastened onto a wheel shaft.
Figure 12:
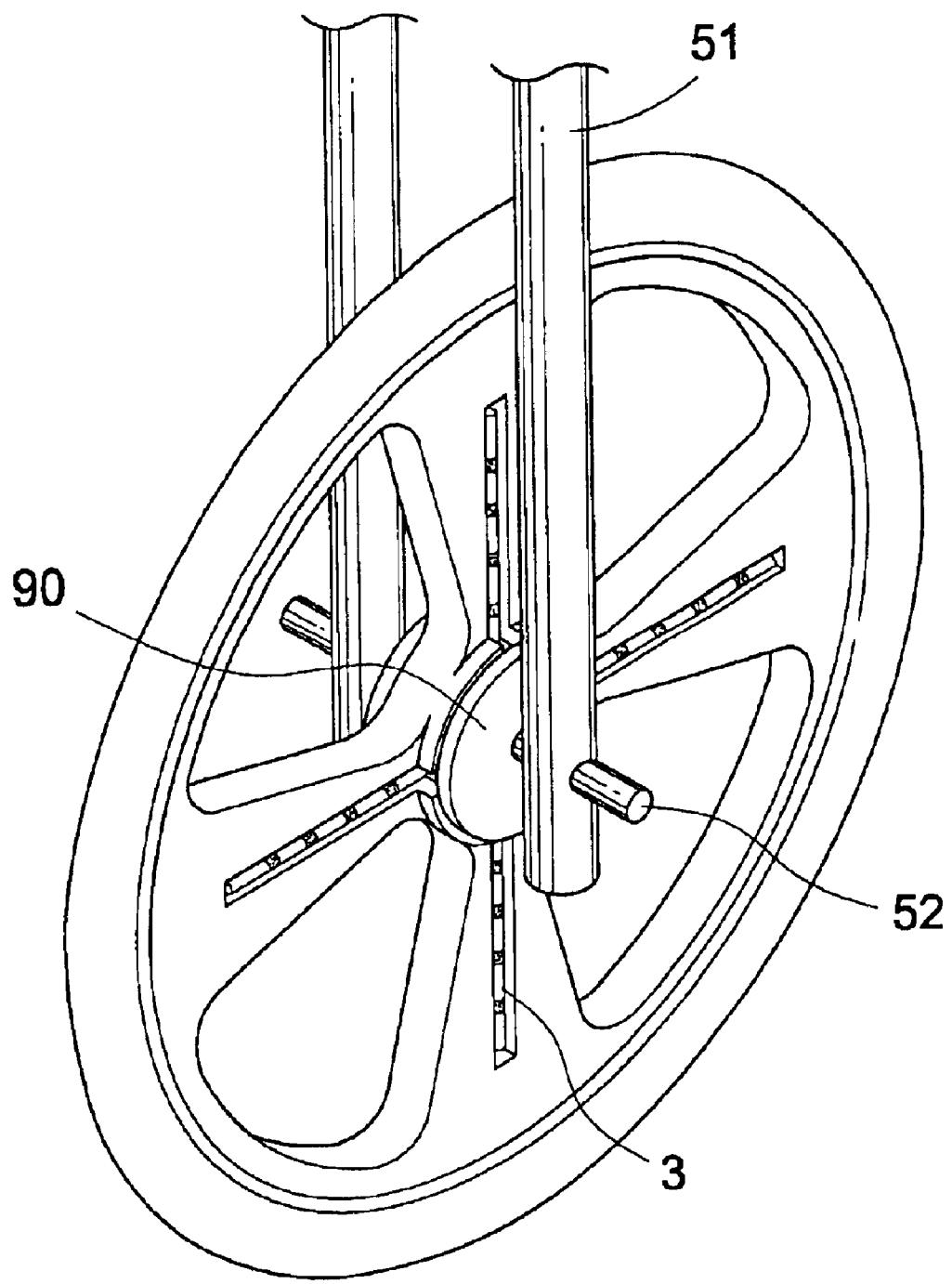
FIG. 12 is a drawing of the assembly of a single magnet case of the present invention fastened onto the wheel shaft.

As shown in FIGS. 11 and 12, the assembled magnet case (40) mentioned in the above exemplary embodiments is substituted by a unitarily molded single magnet case (90) with magnets (9); the single magnet case (90) is fastened on the wheel shaft (52) before installing the wheel frame (51); the magnet (9) inside the single magnet case (90) inducts with the set of induction coils (1) inside the light conductor (3) to achieve the same power generating and luminous effect.

In addition, the fuse of the coils (11) is further pulled and extended to connect with the luminous element (2); when molding the light conductor (3), the luminous element (2) is placed on the top portion of the light conductor (3) for guiding the light source toward the wheel shaft (52); although not being shown in the Figures, the luminous element (2) can be alternatively placed in the middle section of the light conductor (3) for guiding the light source in two directions toward both the wheel shaft (52) and the steel ring (54).

In summation of the above mentioned, the present invention provides a luminous device capable of automatically generating power and a fastening structure to achieve expected functions.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A luminous device capable of automatically generating power installed on a wheel disposed with wheel spokes and steel wires comprising:

an induction coil having a shaft with coils and a single magnet pole; the single magnet pole inserts into the shaft and which has one end extends to define a convex piece;

a luminous element connects with a fuse of the coils and is disposed onto the convex piece of the shaft;

a light conductor with a receiving portion at its distal end receiving the induction coil of the luminous element;

a plurality of magnets are disposed inside an assembled magnet case which is secured on to a wheel frame to make the magnets and the induction coil induct with each other;

wherein a fastening structure is disposed on outer rims of a receiving portion of the light conductor and has a retaining member retained onto the steel wires; an extendable catching body is inserted at a front end of the light conductor and has a movable catching piece thereof fit with a catching tooth disposed at the front end of the light conductor; clamp openings are disposed on two lateral sides of the extendable catching body; the extendable catching body pushes against a steel ring area thereby clamping the clamp openings onto the steel wires and presses the movable catching piece to stop at the catching tooth so as to precisely and steadily hold the luminous device between the steel wires of the wheel, when the wheel spins, it rotates the light conductor thereby making the induction coil inside the light conductor and the magnets on the assembled magnet case induct to generate electric current, further driving the luminous element and guiding the light source of the luminous element outwardly via the light conductor so as to provide a luminous and warning effect.

2. A luminous device capable of automatically generating power according to claim 1, wherein the light conductor is fastened on to a unitarily molded wheel spoke.

3. A luminous device capable of automatically generating power according to claim 1, wherein the light conductor is disposed between the steel wires of the wheel.

4. A luminous device capable of automatically generating power according to claim 1, wherein, the assembled magnet case is adjustably fastened onto a universal joint, the universal joint adjusting an angle of the assembled magnet case to a predetermined position relative to the induction coil.

5. A luminous device capable of automatically generating power according to claim 1, wherein assembled magnet case is unitarily molded and fastened onto the wheel shaft.

6. A luminous device capable of automatically generating power according to claim 1, wherein the light conductor is solid or hollow with the exterior surface thereof formed to have a plurality of matted planes, concave rings, convex portions or through holes capable of refracting or reflecting the light; through the function of having light to refract or reflect at two different mediums or interfaces, a single light source generates a multi light-spot effect and a visual effect of further lightening up the whole wheel surface when the wheel is spinning.

* * * * *